United States Patent [19]
Cliff, Jr.

[11] Patent Number: 5,535,096
[45] Date of Patent: Jul. 9, 1996

[54] SAFETY LOCK-OUT DEVICE FOR ELECTRICAL APPLIANCES

[75] Inventor: Paul L. Cliff, Jr., Bloomingdale, Ill.

[73] Assignee: Universities Research Association, Inc., Washington, D.C.

[21] Appl. No.: 379,270

[22] Filed: Jan. 27, 1995

[51] Int. Cl.⁶ ...................................................... H02B 1/14
[52] U.S. Cl. ............................ 361/726; 174/67; 361/600; 361/616; 439/142
[58] Field of Search ...................... 174/66, 67; 220/241, 220/242; 200/43.02, 43.02, 43.16, 43.19, 43.22; 439/133, 135, 136, 142, 143; 361/825, 617, 600, 601, 605, 615, 616, 622, 641, 657, 679, 724, 726, 796, 804

[56] References Cited

U.S. PATENT DOCUMENTS

| | | |
|---|---|---|
| 1,131,093 | 3/1915 | Sperry . |
| 2,827,674 | 3/1958 | Hauck . |
| 2,987,909 | 6/1961 | Shlank . |
| 3,140,344 | 7/1964 | Slater ........................................ 174/67 |
| 3,614,537 | 10/1971 | Introvigne ................................. 317/99 |
| 4,070,078 | 1/1978 | Chrones ................................. 339/44 R |
| 4,228,317 | 10/1980 | Cziment ..................................... 174/67 |
| 4,237,577 | 12/1980 | Chapel . |
| 4,350,032 | 9/1982 | Kochackis . |
| 4,564,974 | 1/1986 | McGrail et al. . |
| 4,655,487 | 4/1987 | Korn et al. . |
| 4,669,281 | 6/1987 | Young . |
| 4,793,163 | 12/1988 | MacFarlane et al. . |
| 4,893,488 | 1/1990 | Klein . |
| 4,915,638 | 4/1990 | Domian ..................................... 439/142 |
| 4,993,963 | 2/1991 | Pedigro .................................... 439/142 |
| 5,169,326 | 12/1992 | Werner . |
| 5,190,465 | 3/1993 | Davidge et al. . |
| 5,190,466 | 3/1993 | McVey . |
| 5,239,129 | 8/1993 | Ehrenfels .................................. 174/51 |
| 5,387,761 | 2/1995 | Simonis ..................................... 174/67 |

*Primary Examiner*—Gerald P. Tolin
*Attorney, Agent, or Firm*—McAndrews, Held & Malloy, Ltd.

[57] ABSTRACT

A safety lock-out device prevents the insertion of an electrical power cord into an electrical power cord receptacle of an electrical appliance. The devise comprises a mounting plate fastened to the appliance and a cover plate hingedly attached to the appliance. The cover plate is movable between a first position and a second position such that, in the first position, the cover plate covers and prevents insertion of a power cord into the appliance receptacle. In said second position, the appliance receptacle is uncovered to permit insertion of a power cord into the receptacle. Extending a lock shank through aligned openings formed in flange members extending from the mounting plate and the cover plate locks the cover plate in the first position.

2 Claims, 4 Drawing Sheets

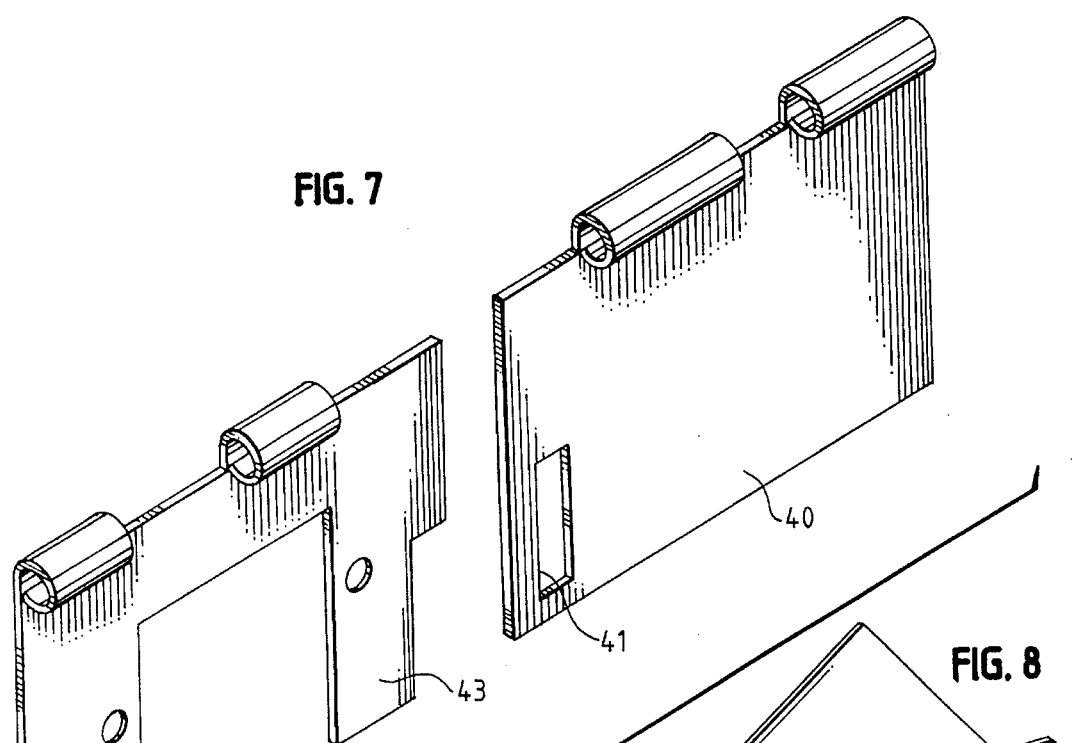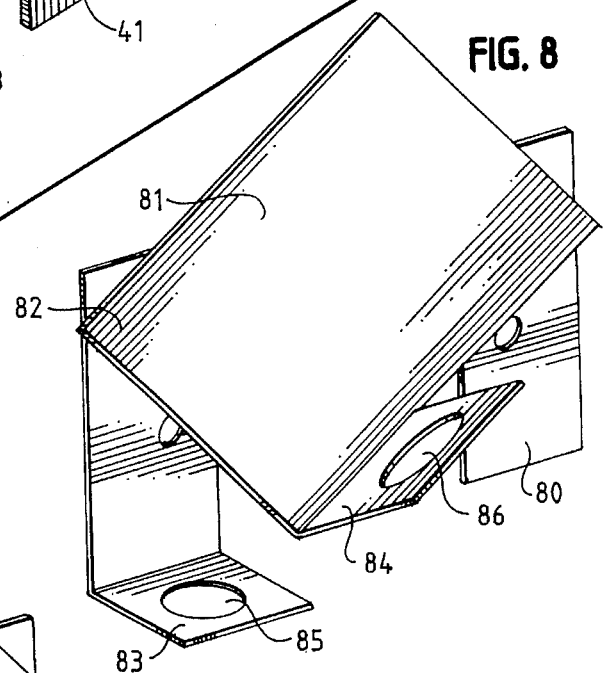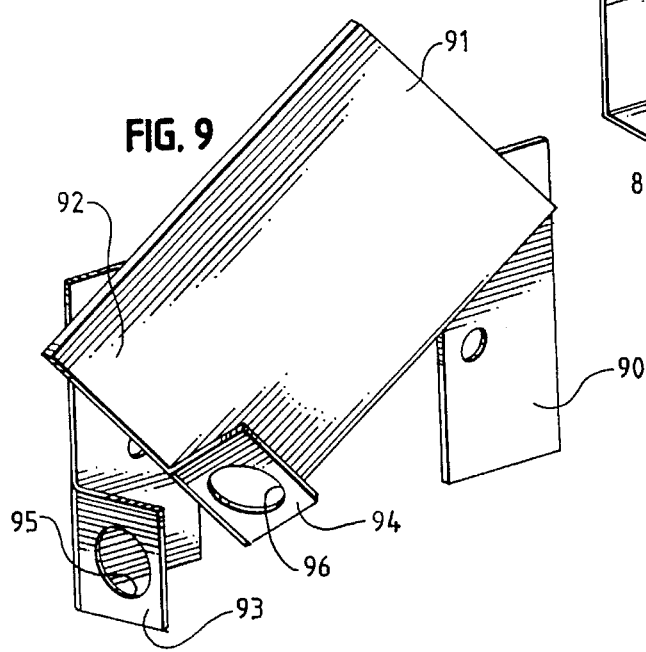

SAFETY LOCK-OUT DEVICE FOR ELECTRICAL APPLIANCES

This invention was made with Government support under Contract No. DE-AC02-76CH03000 awarded by the U.S. Department of Energy. The Government has certain rights in the invention.

FIELD OF THE INVENTION

The present invention relates to a security and safety device for electrical appliances. More particularly, the present invention relates to a device for disabling an electrical appliance by mechanically preventing its connection to an electrical power source.

BACKGROUND OF THE INVENTION

A continuing need exists for protecting computers and other electrical appliances, devices and instruments from unauthorized access or use. A continuing need also exists for preventing such electrical appliances from being connected to power sources during repair and/or handling. The present safety lock-out device addresses these security and electrical safety concerns.

SUMMARY OF THE INVENTION

In accordance with one embodiment of the present invention, an electrical safety lock-out apparatus prevents the insertion of an electrical power cord into an electrical power cord receptacle of an electrical appliance. The apparatus comprises:

(a) a mounting plate fastened to the appliance;
(b) a cover plate hingedly attached to the appliance, the cover plate movable between a first position and a second position such that, in the first position, the cover plate substantially covers and prevents insertion of a power cord into the appliance receptacle, and in the second position, the appliance receptacle is substantially uncovered to permit insertion of a power cord in the receptacle; and
(c) means for locking the cover plate in the first position.

In the preferred apparatus, the locking means comprises at least one flange member extending substantially perpendicularly from the mounting plate and at least one flange member extending substantially perpendicularly from the cover plate. Each of the mounting plate and cover plate flange members having openings formed therein such that, in the first position, the openings align to permit the extension of a lock shank therethrough. The lock shank preferably extends from a padlock.

In an alternative embodiment, the lock means comprises at least one flange member extending substantially perpendicularly from the mounting plate. The cover plate has at least one opening formed therein for receiving each of the at least one flange member. Each of the at least one flange member has an opening formed therein such that, in the first position, the opening permits the extension of a lock shank therethrough.

The cover plate is preferably pivotally attached to the mounting plate.

An further alternative embodiment comprises:

(a) a mounting plate fastened to the appliance, the mounting plate having an opening formed substantially in the central portion thereof and disposed over the receptacle, the mounting plate having a pair of first flange members extending substantially perpendicularly from adjacent the central opening, each of the first flange members having an opening formed therein;
(b) a cover plate hingedly attached to the appliance, the cover plate movable between a first position and a second position such that, in the first position, the cover plate substantially covers and prevents insertion of a power cord into the appliance receptacle, and in the second position, the appliance receptacle is substantially uncovered to permit insertion of a power cord in the receptacle, the cover plate having a pair of second flange members extending substantially perpendicularly therefrom, each of the second flange members having an opening formed therein such that, in the first position, the second flange member openings align with the first flange member openings to permit the extension of a lock shank therethrough.

An improved method prevents the insertion of an electrical power cord into an electrical power cord receptacle of an electrical appliance. The method comprises the steps of:

(a) fixedly attaching a mounting plate to the appliance;
(b) hingedly attaching a cover plate to the appliance, the cover plate being movable between a first position and a second position such that, in the first position, the cover plate substantially covers the appliance receptacle, and in the second position, the appliance receptacle is substantially uncovered; and
(c) selectively locking the cover plate in the first position to prevent insertion of an electrical power cord into the receptacle.

BRIEF DESCRIPTION OF THE DRAWINGS

FIG. 7 is an isometric view of a further alternative embodiment of the safety lock-out device for electrical appliances.

FIG. 8 is an isometric view of a still further alternative embodiment of the safety lock-out device for electrical appliances.

FIG. 9 is an isometric view of yet another alternative embodiment of the safety lock-out device for electrical appliances.

DETAILED DESCRIPTION OF THE PREFERRED EMBODIMENTS

Figure 1:
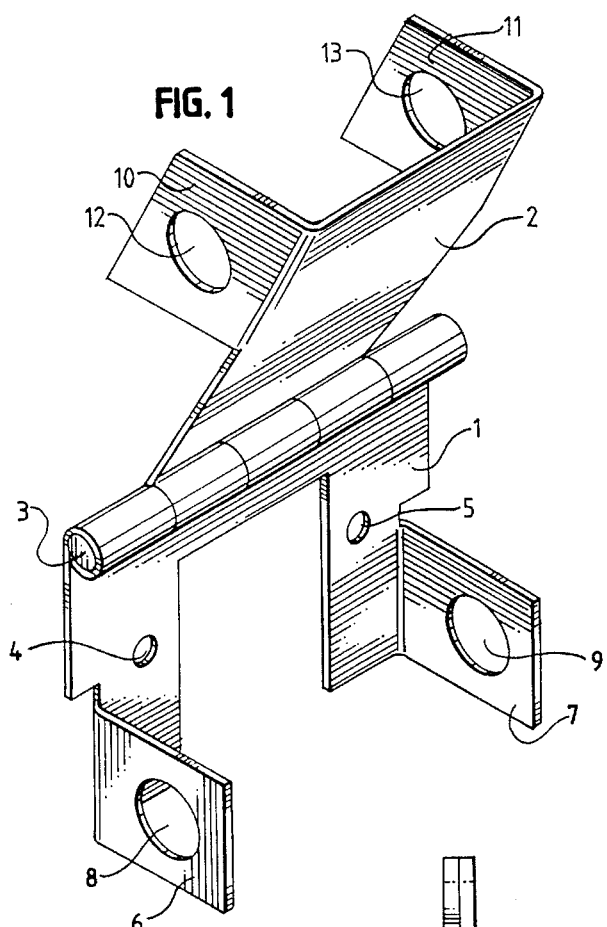
FIG. 1 is an isometric view of one embodiment of a safety lock-put device for electrical appliances.
Figure 2A:
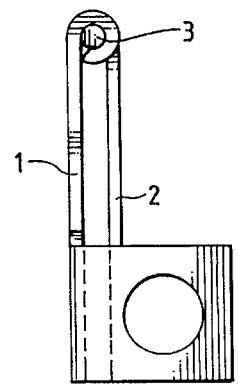
FIGS. 2a and 2b are, respectively, side elevation and top views of the safety lock-out device of FIG. 2.
Figure 2B:
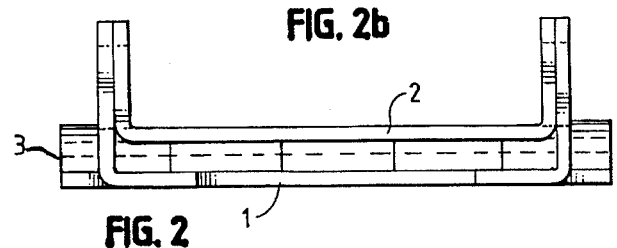
Figure 2:
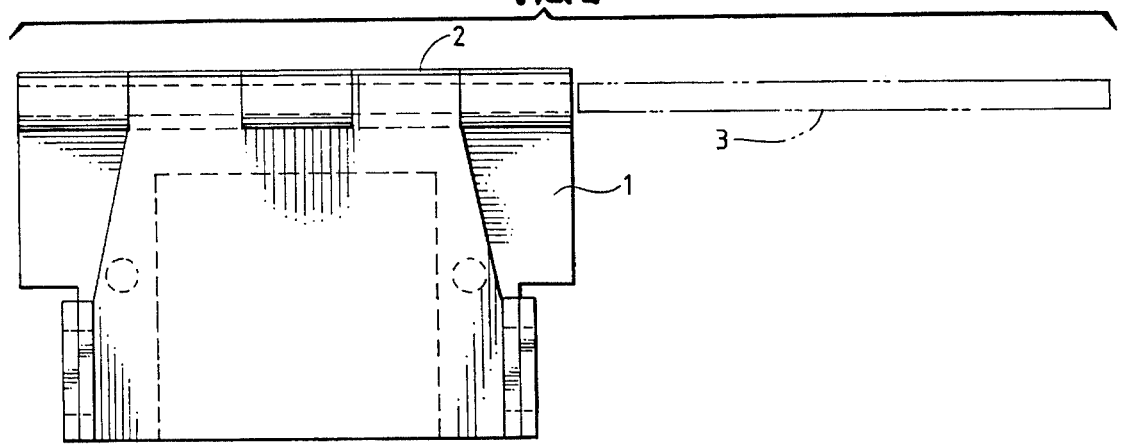
FIG. 2 is a front elevation view of the safety lock-out device of FIG. 1.

Turning first to FIGS. 1 and 2, a preferred embodiment of the safety lock-out device for electrical appliances, such as, for example, desk-top computers, is shown. The safety lock-out device comprises a mounting plate 1 and a cover plate 2 hingedly connected by a pin 3. Mounting plate 1 and cover plate 2 are preferably stamped out of metal, most preferably steel. Other suitable materials, such as, for example, rigid plastic, could also be also employed.

Figure 3:
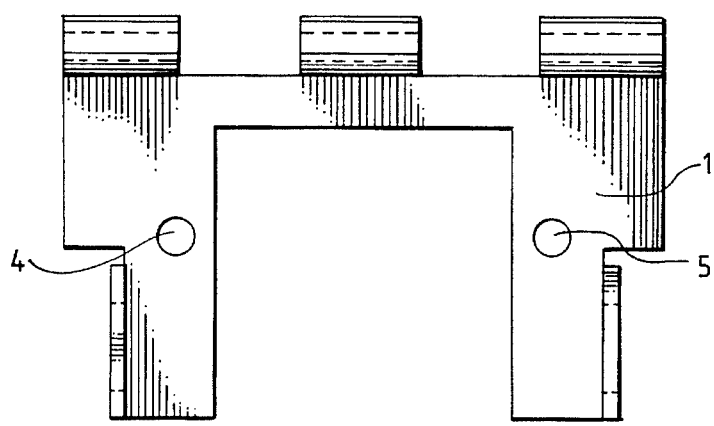
FIG. 3 is a front elevation view of the mounting plate of the safety lock-out device of FIG. 1.
Figure 3A:
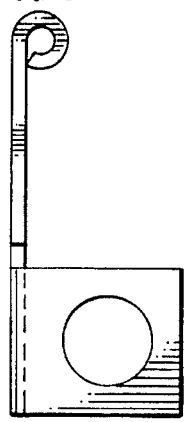
FIGS. 3a and 3b are, respectively, side elevation and top views of the mounting plate of FIG. 3.
Figure 3B:
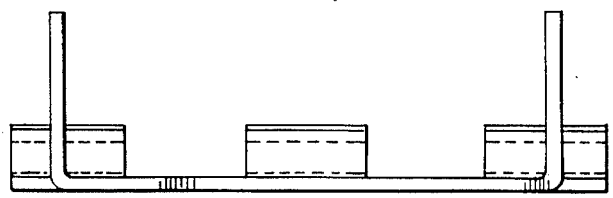
Figure 5:
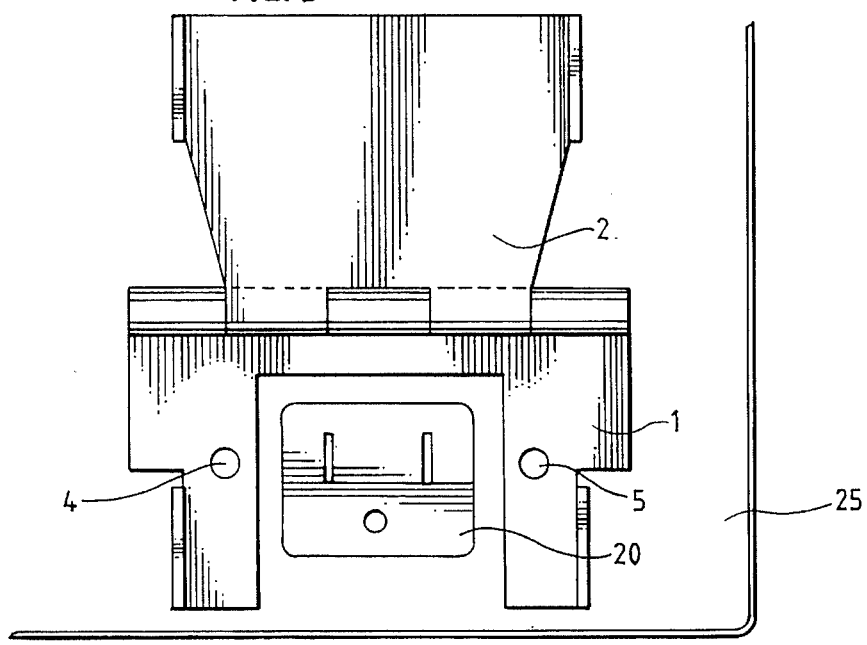
FIG. 5 is a front elevation view of the safety lock-out device of FIG. 1, showing the cover plate in the unlocked and raised position to permit insertion of an electrical power cord into the receptacle of an electrical appliance.

As shown in FIGS. 1-3, mounting plate 1 has mounting holes 4 and 5 formed therein for attaching mounting plate 1 around the electrical power receptacle of an electrical appliance. AC power cord receptacles have been standardized in accordance with International Electrotechnical Commission Publication 320 (1970). Thus, in the embodiment of FIG. 1, the centers of the mounting holes 4 and 5 coincide with those existing on the electrical appliance to provide attachment of the IEC 320 appliance coupler. In FIG. 5, the lock-out device of the preferred embodiment is shown mounted over an IEC 320 electrical power cord receptacle 20 of an electrical appliance 25.

Referring again to FIGS. 1-3, mounting plate 1 also has a substantially open center portion to allow insertion of an electrical power cord into the receptacle. Additionally, mounting plate 1 has two flanges 6 and 7 which extend substantially perpendicularly from the exterior surface of mounting plate 1. Flanges 6 and 7 have openings 8 and 9 formed therein for receiving a locking apparatus such as the bolt or shank of a padlock or equivalent locking device, such as a metal or plastic cable, which includes a shank or length of solid material capable of extending through flange openings 8 and 9.

Figure 4A:
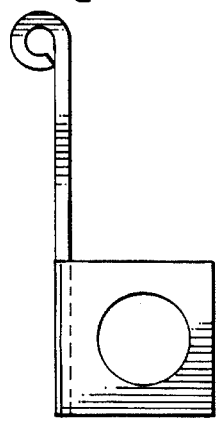
FIGS. 4a and 4b are, respectively, side elevation and top views of the cover plate of FIG. 4.
Figure 4:
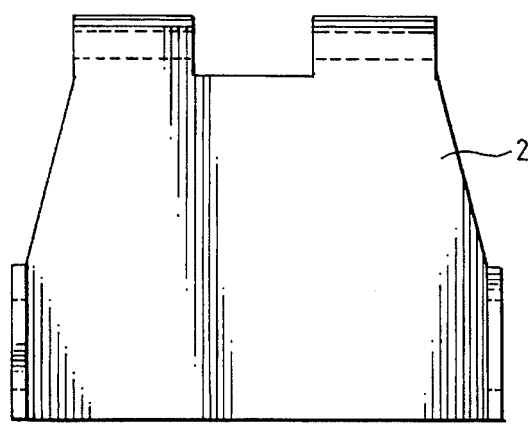
FIG. 4 is a front elevation view of the cover plate of the safety lock-out device of FIG. 1.
Figure 4B:
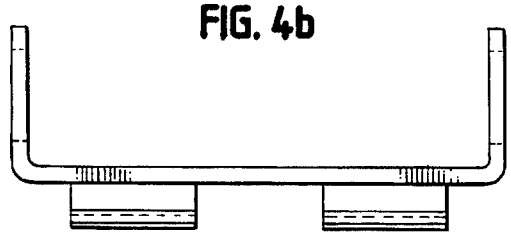

As shown in FIGS. 1, 2 and 4, cover plate 2 is pivotally connected to the stationary mounting plate 1 by a pin 3. Cover plate 2 is preferably a solid piece designed to lay over the substantially open central portion of mounting plate 1. When locked in the position shown in FIG. 2, cover plate 2 prevents access to the underlying electrical power cord receptacle of the adjacent electrical appliance, thereby preventing unauthorized use of or access to the electrical appliance.

Cover plate 2 also has flanges 10 and 11 which extend substantially perpendicularly from the exterior surface of cover plate 2. Cover plate flanges 10 and 11 have openings 12 and 13 formed therein, which align with openings 8 and 9 of flanges 6 and 7 extending from mounting plate 1. Extending a lock shank through the aligned openings 8, 9, 12 and 13 restricts movement of cover plate 2 with respect to mounting plate 1, thereby preventing access to the adjacent power cord receptacle.

In the preferred embodiment, a hinge pin 3 is employed to pivotally attach cover plate 2 to mounting plate 1. However, any of the conventional methods for pivotally attaching two pieces could also be employed. A plastic injection molded embodiment of the present safety lock-out device could employ, for example, single-piece construction with an integral hinge line between the cover and mounting plate portions.

Figure 6:
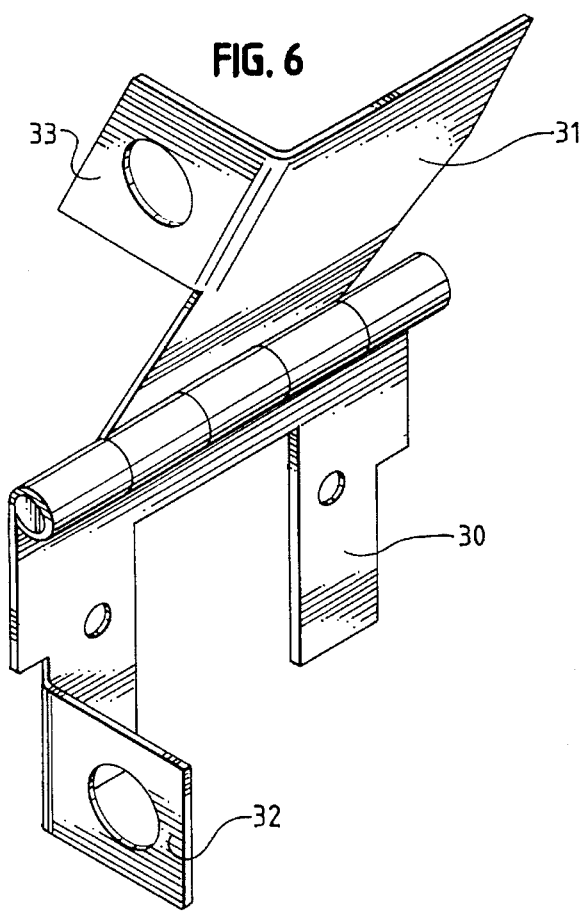
FIG. 6 is an isometric view of an alternative embodiment of the safety lock-out device for electrical appliances.

FIGS. 6-9 illustrate alternative embodiments of the safety lock-out device. FIG. 6 shows a mounting plate 30 and cover plate 31, each having a single flange member 32, 33, respectively, extending therefrom. FIG. 7 depicts an alternative cover plate 40 with an opening 41 for receiving flange member 42 of mounting plate 43. Extending a lock shank through opening 44 when cover plate 40 is in the closed position over the substantially open central portion of mounting plate 43 restricts movement of the cover plate 40 relative to the mounting plate 43.

FIGS. 8 and 9 show other embodiments for pivotally connecting the mounting and cover plates of the safety lock-out device. In FIG. 8, mounting plate 80 and cover plate 81 are mutually hinged by rivet 82. Rotation about rivet 82 allows the openings 85 and 86 of the flange members 83 and 84 to align such that extending a lock shank through the aligned openings 85 and 86 prevents movement of the cover plate 81 relative to mounting plate 80. The embodiment of FIG. 9 operates in a manner similar to that of FIG. 8. Mounting plate 90 and cover plate 91 are pivotally connected by rivet 92. Rotation about rivet 92 aligns openings 95 and 96 of the flange members 93 and 94, thereby allowing a lock shank such as, for example, a lock bolt extending from a padlock, to pass through openings 95 and 96.

Different mechanisms for hingedly attaching the cover plate to the appliance and/or to mounting plate could be employed to achieve substantially the same functional result. Moreover, different locking mechanisms which include lock shanks or bolts could be employed to achieve substantially the same functional result.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An apparatus for preventing delivery of electrical power to an electrical power cord receptacle of an electrical appliance, the apparatus comprising:

(a) an electrical appliance having an electrical power cord receptacle;

(b) a mounting plate fastened to said appliance, said mounting plate having an opening formed substantially in the central portion thereof and disposed over said receptacle, said mounting plate having a pair of first flange members extending substantially perpendicularly from adjacent said central opening, each of said first flange members having an opening formed therein;

(c) a cover plate hingedly attached to said mounting plate, said cover plate movable between a fist position and a second position such that, in said first position, said cover plate substantially covers said appliance receptacle, and in said second position, said appliance receptacle is substantially uncovered, said cover plate having a pair of second flange members extending substantially perpendicularly therefrom, each of said second flange members having an opening formed therein such that, in said first position, said second flange member openings align with said first flange member openings to permit the extension of a lock shank therethrough.

2. The apparatus of claim 1 wherein said lock shank extends from a padlock and through said aligned openings.

* * * * *